United States Patent [19]
Layne

[11] Patent Number: 5,690,210
[45] Date of Patent: Nov. 25, 1997

[54] MODULAR LINK CONVEYOR WITH INTERDIGITATING GRID

[75] Inventor: James L. Layne, Scottsville, Ky.

[73] Assignee: Span Tech Corporation, Glasgow, Ky.

[21] Appl. No.: 660,551

[22] Filed: Jun. 10, 1996

[51] Int. Cl.[6] .................................................. B65G 17/06
[52] U.S. Cl. ............................................................ 198/853
[58] Field of Search .................................... 198/850, 851, 198/852, 853

[56] References Cited

U.S. PATENT DOCUMENTS

| | | | |
|---|---|---|---|
| 3,880,276 | 4/1975 | Willett, III | 198/853 X |
| 3,881,593 | 5/1975 | Mushovic et al. | 198/853 |
| 4,953,693 | 9/1990 | Draebel | 198/853 |
| 4,993,544 | 2/1991 | Bailey et al. | 198/853 X |
| 5,174,439 | 12/1992 | Spangler et al. | 198/853 |
| 5,181,601 | 1/1993 | Palmaer et al. | 198/852 X |
| 5,215,185 | 6/1993 | Counter et al. | 198/853 |
| 5,224,583 | 7/1993 | Palmaer et al. | 198/853 X |
| 5,293,989 | 3/1994 | Garbagnati | 198/853 |
| 5,335,768 | 8/1994 | Schladweiler | 198/853 |
| 5,358,096 | 10/1994 | Faulkner et al. | 198/850 X |
| 5,431,275 | 7/1995 | Faulkner | 198/853 |
| 5,489,020 | 2/1996 | Clopton | 198/853 X |
| 5,497,874 | 3/1996 | Layne | 198/698 |

*Primary Examiner*—James R. Bidwell
*Attorney, Agent, or Firm*—King and Schickli

[57] ABSTRACT

A modular link conveyor including a plurality of modular link assemblies made up of links of an improved design assembled to create a closely interdigitating conveying surface is disclosed. The improved links eliminate undesirable gaps or openings in the conveying surface. Particularly, the improved links include a forwardly extending tongue, projecting from the leading apex of the link, which occupies an open space between the trailing apexes of the legs of the next forward link, thus minimizing the tendency of foreign objects from falling into the open space. The topside of the tongue is tapered downward so as to lift free any objects present in the open spaces primarily while the conveyor is maneuvering through a turn. A forwardly projecting finger, positioned between adjoining links, is also provided for filling a void between the adjoining links. The finger aids in dislodging any foreign objects present in an opening between the legs of the next forward adjoining link, also primarily during turning.

13 Claims, 2 Drawing Sheets

MODULAR LINK CONVEYOR WITH INTERDIGITATING GRID

TECHNICAL FIELD

The present invention relates generally to modular conveyors for moving articles or products along a path, and more particularly, to a modular conveyor link of improved design for establishing a closely interdigitating conveying surface.

BACKGROUND OF THE INVENTION

Today, in many modern manufacturing facilities, modular conveyor systems are extensively utilized to transport articles to and from various work stations during all stages of production. In recent years, manufacturers using production lines with conveyors as an integral component of the material handling system, have realized reasonably significant gains in productivity and resource utilization. As a result, modular conveyor systems have become even more widely implemented and have been adapted to meet an even wider scope of the material handing needs of producers of a multitude of consumer and industrial goods. Therefore, the continual development of improved modular conveyors is necessary in order to keep pace with the demands and expectations of the users of such conveyors.

Thus, notwithstanding recent developments and advancements in conveyor designs, further improvements in the overall design and interaction of the plurality of individual links which make up the conveying surface are desired. One such needed improvement relates to elimination of undesirable gaps or openings which may exist in the conveying surface, so as to better ensure a proper functioning and easy to clean conveyor. Furthermore, smooth link interaction is important, both while the links are moving from an expanded state to a compressed state, or vice-versa, as well as while in a fully or partially compressed state, such as during negotiation of a tight turn. Modular conveyors are often employed for transporting small articles, especially in the food industry, so that minimizing the gaps/openings, is necessary for efficient support of the articles during conveying, which in turn minimizes the waste and cleaning requirements.

In an effort to develop a modular conveyor assembly having the desired characteristics described above, prior art modular conveyors have routinely included links having forward and rearward extending segments that closely interconnect, and substantially close together especially while the conveying surface is in a compressed state. For example, U.S. Pat. No. 4,953,693 to Draebel, owned by the Assignee of the present invention, discloses a closed grid type conveyor assembly wherein there are minimal gaps/openings in the conveying surface once compressed. However, the possibility does exist for objects to fall into gaps/openings which may exist either prior to compression or while maneuvering through a turn. If so, these objects would prevent the links from functioning properly. Furthermore, the blunt ends of the links, typical of prior art modular links, are unable to lift upward any such foreign objects present in the gaps/openings.

Similarly, U.S. Pat. No. 5,174,439 to Spangler et al. also discloses a relatively closed grid type conveyor assembly having closely interconnected links. The link interconnection is enhanced with an undercut being provided on the forward extending portion of the link in order to provide clearance under the rearward extending portion of the next forward link. Nonetheless, there still exists the possibility for objects to fall into or become lodged in gaps/openings between the links while the conveying surface is in an expanded state or while making a turn. There would then be no way for the objects to be lifted out of the gaps/openings. While the undercut may enhance the interconnection of the links, the link end having the undercut is still somewhat blunt and would be unable to effectively lift upward any foreign objects inadvertently present between the links.

Another approach in the prior art, adopted in an effort to improve material handling capabilities, has been to construct an open grid type modular conveyor assembly capable of receiving an article engaging insert. For example, U.S. Pat. No. 5,497,874 to Layne, also owned by the Assignee of the present invention, discloses such an open grid type conveyor assembly. While some openings are required in this type of conveying surface for receiving the insert, the elimination of other unnecessary openings would be desirable. Additionally, the blunt ends of the links are similar to other prior art link ends and thus, unable to lift free objects present between the links.

Thus, it is clear that a need exists for a modular conveyor constructed from smooth interacting links that are closely interdigitating and have the capability of minimizing the possibility of small articles or other like type objects from falling into or becoming lodged in gaps or openings on the conveying surface. Such a conveyor assembly would provide adequate support for the articles during conveying, as well as, minimize waste and ease cleaning requirements. In addition, it is also important that such a conveyor maintain the ability to effectively maneuver through a turn while maintaining the interdigitation. This conveyor would be capable of efficiently moving a wide range of sizes and types of articles along a straight or curved path, while reducing concern of smaller articles falling into gaps/openings and causing disruption of operation and/or cleaning problems.

SUMMARY OF THE INVENTION

It is therefore a primary object of the present invention to overcome the above described limitations and disadvantages of prior art modular link conveyors.

An additional object of the present invention is to provide a modular conveyor having modular links of an improved open design which cooperate to form a closely interdigitating conveying surface, while at the same time allowing for easy cleaning and inspection.

Still another object of the present invention is to provide a modular conveyor having module links of an improved design which reduce the potential for objects to fall into or become lodged in gaps or openings that may exist in the conveying surface both prior to, during and following longitudinal compression of the conveying surface.

Yet another object of the present invention is to provide a modular conveyor having module links of an improved design to form a closely interdigitating conveying surface while still maintaining the ability to maneuver through curves and bends.

Additional objects, advantages and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects, and in accordance with the purposes of the present invention as described herein, a modular link conveyor having a plurality of modular link assemblies of improved design for establishing a closely interdigitating conveying surface is provided. The invention disclosed improves the interaction of the plurality of individual links by eliminating undesirable and unnecessary gaps or openings which may exist in the conveying surface, thus minimizing the possibility for small articles or other objects to fall into or becoming lodged in the gaps/openings. The improved link includes features for achieving the stated purposes both while the links are moving from an expanded state to a compressed state, or vice-versa, as well as while in a fully or partially compressed state, such as during negotiation of a tight turn.

The modular link conveyor is generally formed by a plurality of interconnecting modular links. In general, such a modular conveyor arrangement is disclosed in U.S. Pat. No. 4,953,693 to Draebel, titled "Modular Link Conveyor System" and U.S. Pat. No. 5,497,874 to Layne, titled "Article Engaging insert for Modular Link Conveyor", both patents being assigned to the Assignee of the present invention. The disclosures of these patents are incorporated herein by reference.

In accordance with an important aspect of the present invention, the improved modular link includes a forwardly extending tongue projecting from the leading apex of the link. Preferably the tongue tapers downward in a horizontal plane and includes a top side and a bottom side which meet at a terminal apex. During normal operation of the conveyor along a straight path, the conveying surface is in an expanded state, i.e. the rows of longitudinally repeating links are generally not compressed together. Once the conveyor begins to negotiate a turn, the links positioned on the inside of the turn begin to compress. Compression results in the leading apex moving forward to occupy an open space between the trailing apexes of the next forward link.

As should be appreciated, since the tongue is on the forward portion of the apex, it fills the forward most part of the open space. The tongue captures any small conveyed articles, or similar objects, that happen to be present in the open space. The downward taper of the tongue tends to cause the articles/objects to be lifted upward. Thus, this structure allows for the conveying surface to become fully or partially compressed as needed depending upon the radius of the turn, while at the same time keeping the gaps/openings clear. Were it not for the tapered tongue, objects present between the links would likely become jammed causing disruption in operation of the conveyor. Also, the tongue partially fills the open space while the conveying surface is in an expanded state, thus reducing unnecessary gaps/openings.

In accordance with another important aspect of the present invention, the modular link conveyor may also include a forwardly projecting finger positioned between adjoining laterally repeating links. In a manner similar to the forwardly extending tongue as described above, the finger moves forward during turning of the conveying surface so as to fill an opening which exists between the legs of the next forward adjoining links adjacent the trailing apex. As should be appreciated, the finger moving forward into the opening thus aids in dislodging any objects which may be present in the opening during turning of the conveyor.

As should be further appreciated, the finger continuously occupies the void between the adjoining links. This further inhibits small articles or other objects from falling into or becoming lodged between the links during operation of the conveyor. In addition, the elimination of unnecessary openings in the conveying surface provides for more support of the articles during conveying, while at the same time maintaining the generally open style link construction. Accordingly, the forwardly projecting finger is an important component in forming a proper functioning and more productive modular link conveyor.

In accordance with yet another important aspect of the present invention, the trailing apex of the improved modular link includes an open groove which exposes the hole that passes transversely therethrough. More specifically, the open groove exposes the hole and connecting rod which passes through the hole to connect the repeating modular link assemblies together. By exposing the connecting rod and providing access thereto, it is much easier to visually inspect the connecting rod for wear following extended periods of use. Additionally, the connecting rod can be accessed through the open groove for other purposes, such as cleaning, which is an important concern for conveyors used in, for example, the food processing industry where cleanliness is of the utmost importance.

Advantageously, longitudinal compression of the conveying surface along the inside of the curve during turning results in the forwardly projecting finger, which is axially aligned with the open groove, extending into the open groove on the next forward link. This allows for the finger to then protrude into the opening between the legs of the next forward adjoining links, as described above.

In accordance with still yet another important aspect of the present invention, the legs of the improved modular link include a two way angled undercut adjacent both the leading apex and the trailing apex. The angle of each undercut is obtuse; approximately 160°–170°. This provides increased clearance and thus cooperation between the links, especially when the path of the conveying surface includes curves or bends. More specifically, the obtuse angles of the undercuts provide additional pivot area for the links.

Additionally, the improved modular link includes a side fin which spans the undercut adjacent the trailing apex for engaging the slot which passes through the leading apex. Advantageously, the side fin functions to further assist and guide the links when it is necessary for the conveying surface to traverse bends and curves. Thus, it should be appreciated that the undercut on the legs and the side fin work together and cooperate to allow the conveying surface to maintain its maneuverability. This interaction is another important aspect of maintaining the smooth interaction between the links and the closely interdigitating conveying surface. Indeed, it should be recognized that all of the improvement features of the present invention function in a cooperative manner in order to provide an optimized functioning modular link conveyor.

Still other objects of the present invention will become apparent to those skilled in this art from the following description wherein there is shown and described a preferred embodiment of this invention, simply by way of illustration of one of the modes best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWINGS

The accompanying drawings incorporated in and forming a part of the specification, illustrates several aspects of the present invention and together with the description serves to explain the principles of the invention. In the drawings:

FIG. 3 is a side elevational view of the single modular link;

FIG. 4 is a top plan view showing the interaction between two modular link assemblies, while in an expanded state and travelling in a straight path.

Reference will now be made in detail to the present preferred embodiment of the invention, an example of which is illustrated in the accompanying drawings.

DETAILED DESCRIPTION OF THE PREFERRED EMBODIMENT

Figure 1:
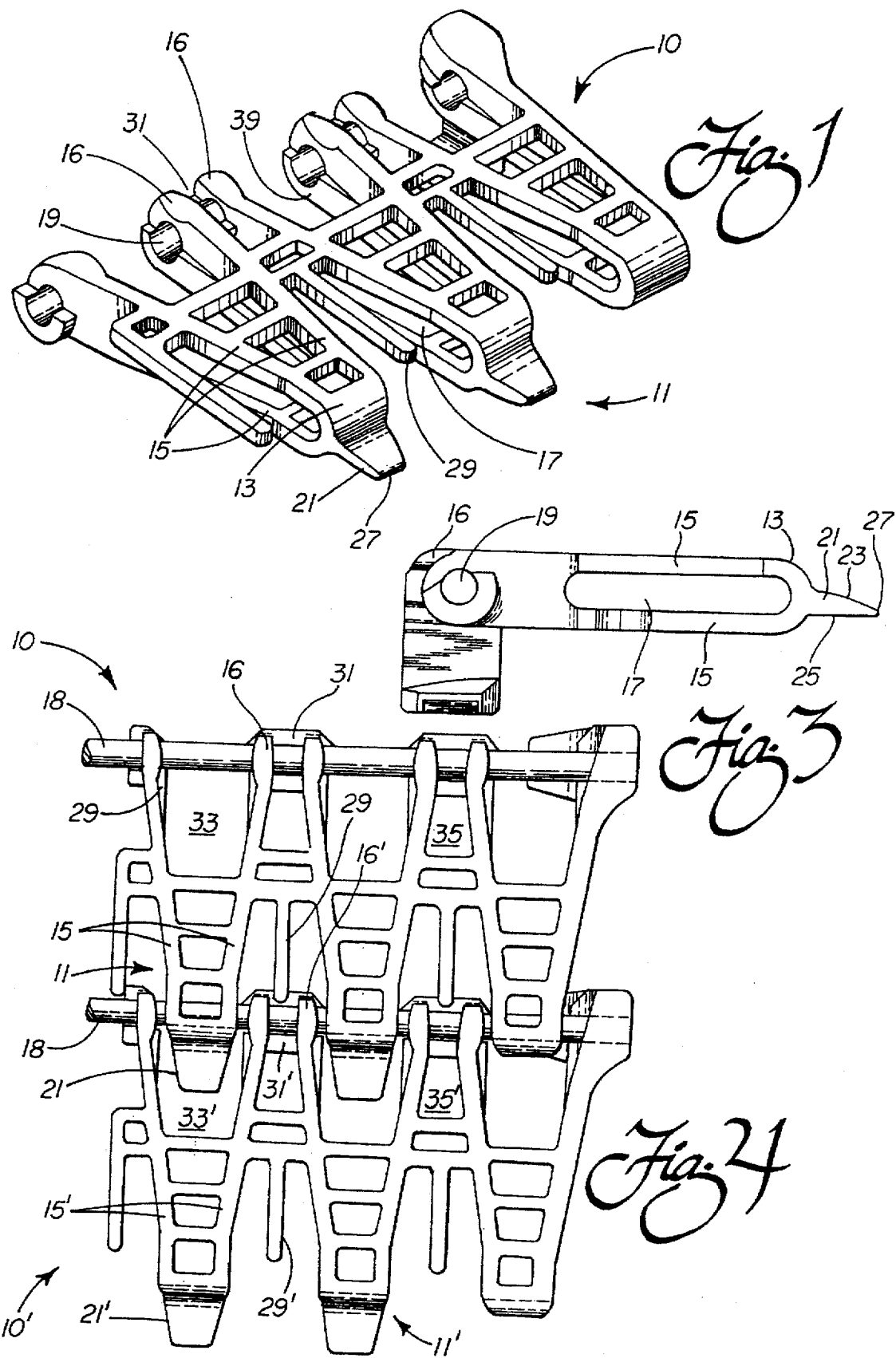
FIG. 1 is a perspective view of one form of modular link assembly comprised of three laterally disposed repeating modular links.
Figure 2:
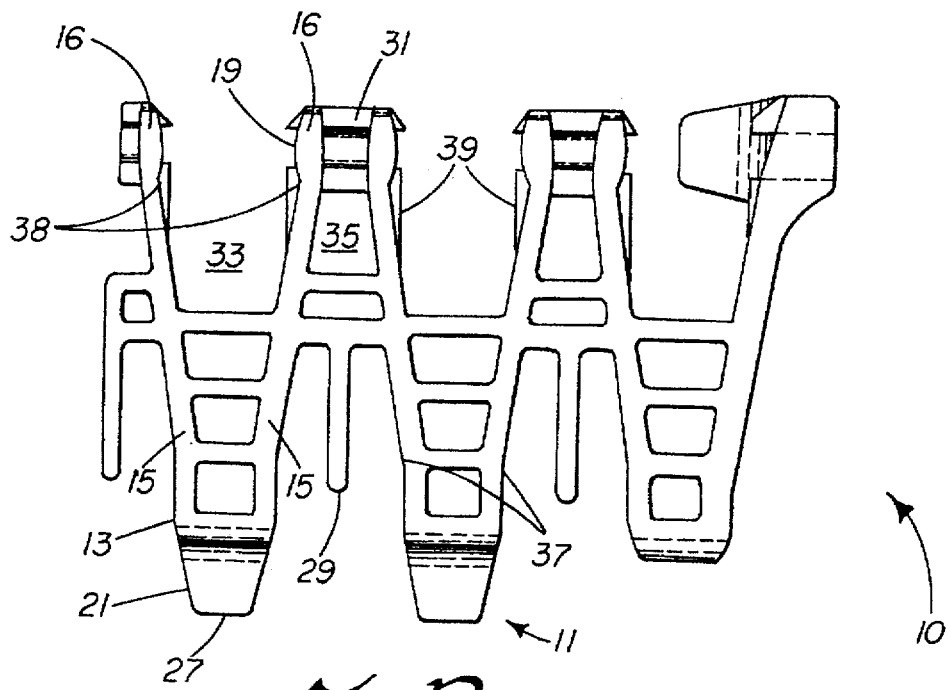
FIG. 2 is a top plan view of the single modular link assembly of FIG. 1.

Reference is now made to FIGS. 1 and 2 showing a single modular link assembly 10 comprised of a plurality of individual links 11, which can be either formed integrally together in any suitable number, or as separate links 11. As will become apparent by reviewing the description below, the assembly 10, and more specifically the individual links 11, are of an improved design so as to establish a closely interdigitating conveying surface, while at the same time assuring that the links have exceptionally smooth interaction with each other. As a result, a more efficient modular link conveyor for moving articles or products along a straight or curved conveying path is obtained.

Each individual link 11 includes a leading apex 13 and a pair of legs 15 extending at an acute angle therefrom. The legs 15 terminate at a trailing apex 16. A plurality of transverse connectors 18 (see FIG. 4) are provided to interconnect and retain the module assembly 10 together, thereby forming a complete modular link conveyor. More specifically, the leading apexes 13 of the links 11 include a transversely oriented slot 17 for receiving the connectors 18. The trailing apex 16 includes a transverse hole 19 for also receiving the connectors 18. The slots 17/holes 19 are co-axial such that each connector 18 passes freely through all aligned holes 19 and slots 17. When properly connected, the connectors 18 join the legs 15 of the links 11 in one row with the leading apexes 13 of the links 11 in the next forward row to form the modular link conveyor.

A more detailed disclosure of the foregoing type conveyor is described in U.S. Pat. No. 4,953,693 to Draebel and U.S. Pat. No. 5,497,874 to Layne, both of which the present application is an improvement thereof, and both of which are incorporated herein by reference. While the preferred embodiment of the present invention sets forth an improved link 11 for forming an open grid modular conveyor, as disclosed in the '874 patent to Layne, it should be appreciated that the improvement concepts of the present invention may also be used in conjunction with other type modular conveyors.

According to an important aspect of this invention, and as best shown in FIGS. 1 and 3, the links 11 further include a forwardly extending tongue 21 projecting from the leading apex 13. The tongue 21 has a top side 23 and a bottom side 25 which meet at a terminal apex 27. Preferably, the tongue 21 is tapered in the horizontal plane. More specifically, the tongue 21 tapers from the leading apex 13 downward to the terminal apex 27.

As best shown in FIGS. 1 and 2, the assembly 10 further includes a forwardly projecting finger 29 positioned between adjoining links 11. The trailing apex 16 includes an open groove 31 in axial alignment with the finger 29. Advantageously, the open groove 31 exposes the hole 19, and more specifically exposes the connectors 18 which pass transversely through the holes of trailing apex 16. This open groove concept allows for visual inspection of the connectors 18 for ordinary wear. Deleterious mechanical wear, or even failure following extended periods of use, can thus be better avoided. Also, the connectors 18 may be accessed via open groove 31 for other purposes such as cleaning, an important concern for modular link conveyors used in, for example, food processing industries.

From the foregoing description, it will be realized that a plurality of laterally and longitudinally repeating modular assemblies 10, and more specifically a plurality of repeating links 11, are assembled to create a closely interdigitating conveying surface. As should be further realized, the improvements of the present invention, for example, the forwardly extending tongue and the forwardly projecting finger, eliminate undesirable and unnecessary gaps or openings, which may exist in the conveying surface. Thus, the tongue and finger concepts are important improvements resulting an improved interdigitating grid surface for conveying, while at the same time maintaining the basic open design for cleaning, and with the attendant advantage of being lighter in weight and generally lower in cost. Such individual features, or the combination, are previously unknown in the relevant art.

Figure 5:
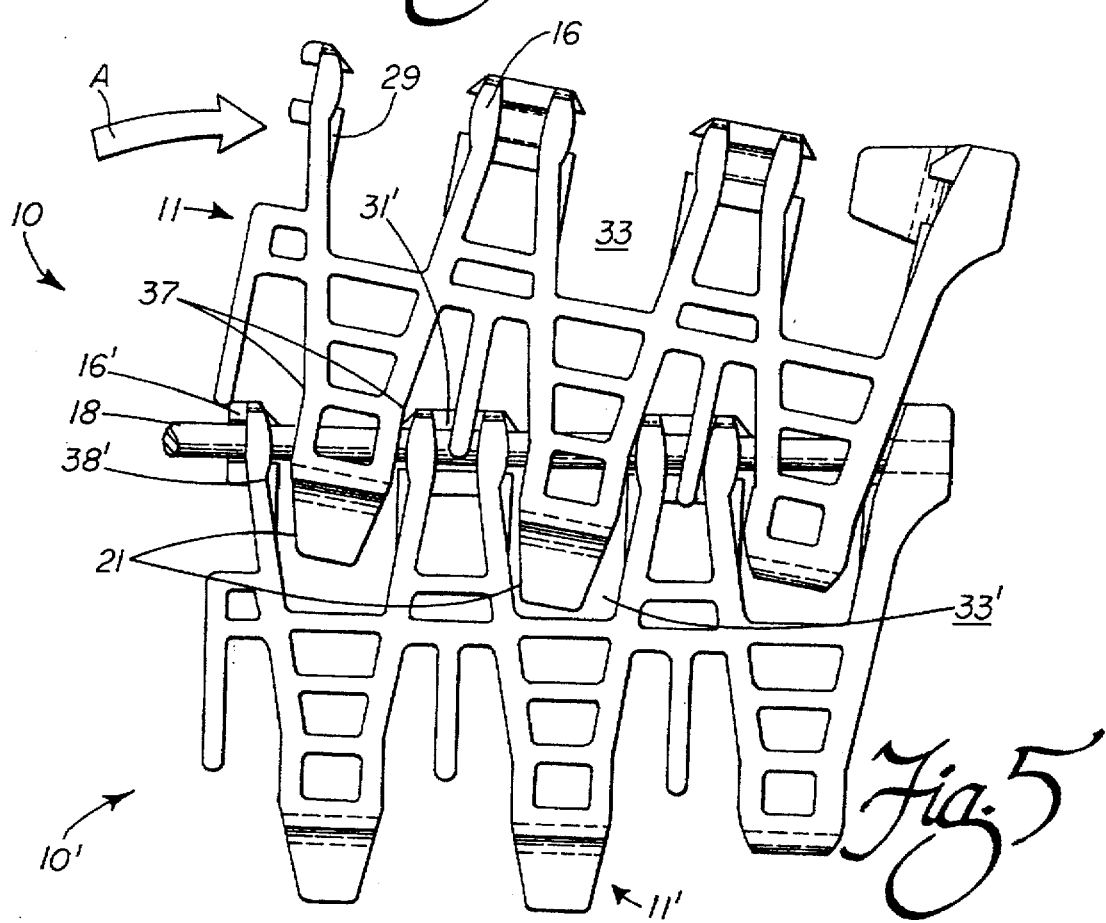
FIG. 5 is a top plan view showing the interaction between two modular link assemblies while maneuvering through a turn, as indicated by action arrow A.

With reference to FIG. 4, two modular link assemblies 10, 10' and their interaction are shown. More specifically, during operation along a straight path the conveyor is in an expanded or semi-expanded state, i.e. the rows of longitudinally repeating modules 10 are generally not compressed together. As best shown in FIG. 5, once the conveyor begins to negotiate a turn, the links or modules begin to compress differentially along connector 18.

When the conveyor assemblies 10, 10' are in an expanded state (FIG. 4), gaps or openings exist between the links. For example, there are open spaces 33, 33' formed between legs 15, 15', respectively, and openings 35, 35' which are formed between the legs of adjoining repeating links 11, 11', respectively, adjacent the trailing apexes 16, 16'. Except for the inventive use of the tongue/finger concepts, it should be recognized that there would exist the possibility for small articles, which are being transported upon the conveying surface, or foreign objects, to fall into gaps/openings and become lodged. Then, once the conveyor would enter a turn and compression begins, the conveying surface would be prevented from completely compressing together as intended. Thus, this would necessitate stopping the conveyor for removing these articles/objects, resulting in costly downtime. Furthermore, physical damage could possibly result to the articles being transported and/or the conveyor.

It can now be more fully seen how the tongue 21 and finger 29 form particularly important components in establishing a closely interdigitating conveying surface while maneuvering through a turn. As best shown in FIG. 5, leading apex 13 and tongue 21 can move all the way forward into the open space 33' and essentially close it. With the top side 23 of tongue 21 being tapered downward, any small articles or objects of like type that happen to be present in open space 33' are lifted upward and out of the open space.

Thus, the modules 10, 10' are allowed to fully compress together as intended, enabling the conveyor to properly negotiate the turn. Without the tapered tongue 21, any foreign objects present in open space 33' could merely become jammed between modules 10, 10' during compression, causing disruption in the turning operation of the conveyor assembly.

The forwardly projecting finger 29 also moves forward during compression so as to aid in dislodging any foreign objects which may be present in the opening 35. This further prevents small articles or other objects from falling into or becoming jammed in opening 35' during turning of the conveyor. Additionally, the positioning of finger 29 also provides for more structural support of the articles being transported on the conveyor over the openings 35, 35'.

As best shown in FIGS. 2 and 5, the improved modular link assembly 10 of the present invention further include two-way angled undercuts 37, 38 on legs 15 adjacent both the leading apex 13 and the trailing apex 16, respectively. The undercuts 37, 38 provide increased cooperation between the closely interconnected links 11 when the modules 10, 10' are maneuvering through curves and bends in the flow path. Specifically, the angled undercut 37 adjacent the leading apex 13 provides increased pivoting area for trailing apex 16' of the next forward link. Likewise, the angled undercut 38' adjacent the trailing apex 16' provides increased pivoting area for the leading apex 13 and the tongue 21. The undercuts 37, 38 operate in two ways, that is in either a right or left turn.

In addition, the assemblies 10 include a side fin 39 spanning the undercut 38 adjacent the trailing apex 16. When the conveying surface is traversing a curve or bend, the side fin 39 engages the inside surface forming the slot 17 which passes through the leading apex 13. The side fin 39 thus serves as a means for helping guide the links 11 through the bends or curves.

The combination of the angled undercuts 37, 38 and the side fin 39 work in close cooperation to allow for smooth link interaction and the conveying surface to maintain its maneuverability. The increased cooperation between the links 11 allow for a tighter turning radius to be achieved, but at the same time keeping the movement as smooth as possible. In the final analysis, not only are the current uses made more efficient and productive, but also alternative uses and locations for deploying modular link conveyors utilizing the improvement concepts of the present invention are opened.

In summary, numerous benefits have been described which result from employing the concepts of the present invention. The modular link conveyor assemblies 10, and more specifically the links 11, are capable of establishing a close interdigitating grid conveying surface. The tongue 21 and the finger 29 work in cooperation to eliminate any undesirable or unnecessary openings or gaps in the conveying surface. This minimizes the possibility of small articles or other objects present on or near the conveying surface from falling into or becoming jammed in the openings/gaps and disrupting the operation of the conveyor. Advantageously, the tongue 21 occupies opening 33, and with its tapered top side 23 is capable of lifting upward any article or foreign object inadvertently present. Furthermore, finger 29 dislodges any article or foreign object present in opening 35. Additionally, the angled undercuts 37, 38 and the side fin 39 compliment the action of the tongue 21 and finger 29 by providing a guiding action to assure that the conveyor is able to traverse curves and bends in an efficient and smooth manner. The improvement concepts of the present invention cooperatively work together in an unusually exceptional manner so as to create an all around proper functioning and efficient modular link conveyor.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as is suited to the particular use contemplated. All such modifications and variations are within the scope of the invention as determined by the appended claims when interpreted in accordance with breadth to which they are fairly, legally and equitably entitled.

I claim:

1. A modular link conveyor for moving articles along a path, the improvement comprising:

a plurality of modular link assemblies forming a conveying surface including a plurality of laterally and longitudinally disposed repeating links defining an interdigitating grid, each of said links including at least one leading apex and two legs extending therefrom forming an open space in between, said leading apex further including a slot passing transversely therethrough across substantially the full width of said links, said legs further terminating in a trailing apex, each said trailing apex including a hole passing transversely therethrough;

a plurality of transverse connecting means passing through said slots and said holes to connect said longitudinally repeating modular links together; and a forwardly extending tongue tapered in the horizontal plane and projecting from said leading apex, said tongue including a topside and a bottom side, said topside and said bottom side meeting at a terminal apex, whereby longitudinal compression of the conveying surface results in said tongue substantially filling said open space between the trailing apexes of the next forward links in said interdigitating grid so that any foreign object present in said space is lifted free as said tongue moves forward into said space.

2. The modular link conveyor of claim 1 wherein adjoining legs of said laterally repeating links adjacent said trailing apex form an opening.

3. The modular link conveyor of claim 2 wherein each of said link assemblies further include a forwardly projecting finger positioned between said laterally repeating links in said interdigitating grid, whereby said longitudinal compression of the conveying surface results in said finger substantially filling said opening between said legs so that any foreign object present in said opening is dislodged as said finger moves forward into said opening.

4. The modular link conveyor of claim 3 wherein said trailing apex includes an open groove adjacent said opening exposing said hole passing through said trailing apex to allow cleaning and inspection, and whereby said longitudinal compression results in said finger extending through said open groove and into said opening.

5. The modular link conveyor of claim 4 wherein said legs include angled undercuts adjacent both said leading apex and said trailing apex to provide improved mating between said links during said longitudinal compression.

6. The modular link conveyor of claim 5 further including a side fin spanning said angled undercut adjacent said trailing apex for engaging said slot so as to guide said links during said longitudinal compression.

7. The modular link conveyor of claim 1 wherein said legs include an angled undercut adjacent both said leading apex and said trailing apex to provide improved mating between said links during said longitudinal compression.

8. The modular link conveyor of claim 7 further including a side fin spanning said angled undercut adjacent said trailing apex for engaging said slot so as to guide said links during said longitudinal compression.

9. The modular link conveyor of claim 1 wherein said topside of said tongue tapers from said leading apex of said link downward to said terminal apex.

10. A modular link conveyor for moving articles along a path, the improvement comprising:

a plurality of modular link assemblies forming a conveying surface including a plurality of laterally and longitudinally disposed repeating links defining an interdigitating grid, each of said links including at least one leading apex and two legs extending therefrom, said leading apex further including a slot passing transversely therethrough across substantially the full width of said link, said legs further terminating in a trailing apex, each said trailing apex including a hole passing transversely therethrough, adjoining legs of said laterally repeating links adjacent said trailing apex forming an opening;

a plurality of transverse connecting means passing through said slots and said holes to connect said longitudinally repeating modular links together; and a forwardly projecting finger positioned between said laterally repeating links in said interdigitating grid, whereby said longitudinal compression of the conveying surface results in said finger substantially filling said opening between said legs so that any foreign object present in said opening is dislodged as said finger moves forward into said opening.

11. The modular link conveyor of claim 10 wherein said trailing apex includes an open groove adjacent said opening exposing said hole passing through said trailing apex to allow cleaning and inspection, and whereby said longitudinal compression results in said finger extending through said open groove and into said opening.

12. The modular link conveyor of claim 10 wherein said legs include angled undercuts adjacent both said leading apex and said trailing apex to provide improved mating between said links during said longitudinal compression.

13. The modular link conveyor of claim 12 further including a side fin spanning said angled undercut adjacent said trailing apex for engaging said slot so as to guide said links during said longitudinal compression.

* * * * *